(12) United States Patent
Pruner

(10) Patent No.: US 9,280,570 B2
(45) Date of Patent: Mar. 8, 2016

(54) SYSTEM AND METHOD FOR DELETION COMPACTOR FOR LARGE STATIC DATA IN NOSQL DATABASE

(71) Applicant: Avaya Inc., Basking Ridge, NJ (US)

(72) Inventor: Anne Pruner, Ontario (CA)

(73) Assignee: Avaya Inc., Basking Ridge, NJ (US)

( * ) Notice: Subject to any disclaimer, the term of this patent is extended or adjusted under 35 U.S.C. 154(b) by 257 days.

(21) Appl. No.: 13/852,799

(22) Filed: Mar. 28, 2013

(65) Prior Publication Data

US 2014/0297601 A1 Oct. 2, 2014

(51) Int. Cl.
*G06F 7/02* (2006.01)
*G06F 17/30* (2006.01)

(52) U.S. Cl.
CPC .... *G06F 17/30303* (2013.01); *G06F 17/30235* (2013.01); *G06F 17/30315* (2013.01); *G06F 17/30339* (2013.01)

(58) Field of Classification Search
CPC ................... G06F 17/30303; G06F 17/30315; G06F 17/30339; G06F 17/30153; G06F 17/30
See application file for complete search history.

(56) References Cited

U.S. PATENT DOCUMENTS

| | | | |
|---|---|---|---|
| 2005/0240615 A1 | 10/2005 | Barsness et al. | |
| 2011/0276744 A1* | 11/2011 | Sengupta | G06F 12/0866 711/103 |
| 2012/0078978 A1 | 3/2012 | Shoolman et al. | |
| 2013/0311612 A1* | 11/2013 | Dickinson | 709/219 |
| 2013/0339293 A1* | 12/2013 | Witten et al. | 707/609 |
| 2014/0215170 A1* | 7/2014 | Scarpino et al. | 711/161 |
| 2014/0244599 A1* | 8/2014 | Zhang et al. | 707/692 |

OTHER PUBLICATIONS

Combined Search and Examination Report dated May 29, 2014 and May 30, 2014, respectively, issued in connection with corresponding GB Patent Application No. 1322547.9 (4 pages total).
"Cassandra in Production: Things We Learned" [Waltjones]. The Moz Developer Blog. Nov. 10, 2011, Retrieved from: http://devblog.moz.com/2011/11/cassandra-in-production-things-we-learned/ Retrieved on: May 28, 2014 (5 pages total).

* cited by examiner

*Primary Examiner* — Bruce Moser

(57) ABSTRACT

System and method to compact a NoSQL database, the method including: receiving, by a receiver coupled to a processor, an indication of a record to delete in the NoSQL database; for each file in the NoSQL database, perform the steps of: if said file does not contain the record to delete, placing said file in a first memory; if said file contains the record to delete: placing said file in a second memory; searching whether the record to delete from said file in the second memory matches a record in one or more files in the first memory; and if a searched files in the first memory contain the record to delete from said file in the second memory, compacting said file in the second memory with the files in the first memory that contain the record to delete.

14 Claims, 3 Drawing Sheets

100

200

300

SYSTEM AND METHOD FOR DELETION COMPACTOR FOR LARGE STATIC DATA IN NOSQL DATABASE

BACKGROUND

1. Field of the Invention

Embodiments of the present invention generally relate to operation of a NoSQL database, and, in particular, to a system and method for efficiently compacting a large NoSQL database in which a majority of the data is substantially static.

2. Description of Related Art

Conventional Structured Query Language ("SQL") refers to a special-purpose programming language designed for managing data in a relational database management system ("RDMS"), which is usually a table-based database. When an existing row is updated, an SQL database will read in the existing row, update it, and rewrite it. Similarly, on a row delete, SQL would delete the row from the table.

NoSQL refers to a broad class of database management systems identified by non-adherence to conventional SQL. A NoSQL database does not work in the same way as a typical SQL database. NoSQL databases are not built primarily on tables, and generally do not use SQL for data manipulation. NoSQL database systems are often highly optimized for retrieval and appending operations and often offer little functionality beyond record storage (e.g. key-value stores). When an existing row (i.e., a record) is updated, a NoSQL database will write a new copy of the row. Upon reading a record, the NoSQL database will find the newest version of the row and chooses that as the correct version. Upon deleting a record, the NoSQL database will write a new copy of the row, with the new copy being marked as a deleted record. The reduced run-time flexibility of NoSQL compared to conventional SQL systems is compensated by marked gains in scalability and performance for certain data models. NoSQL database management systems may be useful when working with a huge quantity of data when the nature of the data does not require a relational model.

An example of a NoSQL database is Cassandra. Cassandra is known as an open source distributed database management system that is designed to handle large amounts of distributed data. Cassandra provides a structured key-value store. Keys map to multiple values, which are grouped into column families. The column families are fixed when a Cassandra database is created, but columns can be added to a family at any time. Furthermore, columns are added only to specified keys, so different keys can have different numbers of columns in any given family. The values from a column family for each key are stored together.

Database operation typically includes adding, deleting, and modifying records. Over time, storage space may be wasted where obsolete or now-deleted records were stored, causing the database size to be larger than necessary. Compaction is a process by which such wasted space within a database may be reclaimed. Compaction serves two main purposes: iteratively reordering the data so they can be accessed faster, and getting rid of obsolete data, i.e. overwritten or deleted, in order to reclaim space.

Periodically, the NoSQL database will gather up groups of data files for a particular column family (similar to a table in a conventional SQL database) and compact the group of data files. This involves writing into new files all the current versions of the rows that exist in that group of data files. This eliminates the duplicate versions, and allows deletions to occur.

Compaction processes of the known art require copying of data over and over. For a large database whose data is also substantially static (i.e., most of the data does not change in between instances of the compaction process), compaction processes of the known art are relatively inefficient. The inefficient processes for this type of database result in excessive resource usage such as excessive CPU usage, excessive disk writes, and excessive temporary disk usage for overhead purposes. Furthermore, the excessive resource usage tends to discourage a more frequent compaction schedule.

Therefore, a need exists to provide a more efficient compaction process tailored to large databases whose data is also substantially static, in order to overcome the aforementioned shortcomings of the known art, and ultimately to provide improved customer satisfaction.

SUMMARY

Embodiments of the present invention generally relate to operation of a NoSQL database, and, in particular, to a system and method for efficiently compacting a large NoSQL database in which a majority of the data is substantially static.

Embodiments in accordance with the present invention include a method to compact a NoSQL database, the method including: receiving, by a receiver coupled to a processor, an indication of a record to delete in the NoSQL database; for each file in the NoSQL database, perform the steps of: if said file does not contain the record to delete, placing said file in a first memory; if said file contains the record to delete: placing said file in a second memory; searching whether the record to delete from said file in the second memory matches a record in one or more files in the first memory; and if a searched files in the first memory contain the record to delete from said file in the second memory, compacting said file in the second memory with the files in the first memory that contain the record to delete.

Embodiments in accordance with the present invention include a system to compact a NoSQL database, the system including: a receiver coupled to a processor, the receiver configured to receive an indication of a record to delete in the NoSQL database; a processor coupled to a first memory and a second memory, the processor configured to perform for each file in the NoSQL database, the steps of: if said file does not contain the record to delete, placing said file in the first memory; if said file contains the record to delete: placing said file in the second memory; searching whether the record to delete from said file in the second memory matches a record in one or more files in the first memory; and if a searched files in the first memory contain the record to delete from said file in the second memory, compacting said file in the second memory with the files in the first memory that contain the record to delete.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concept of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
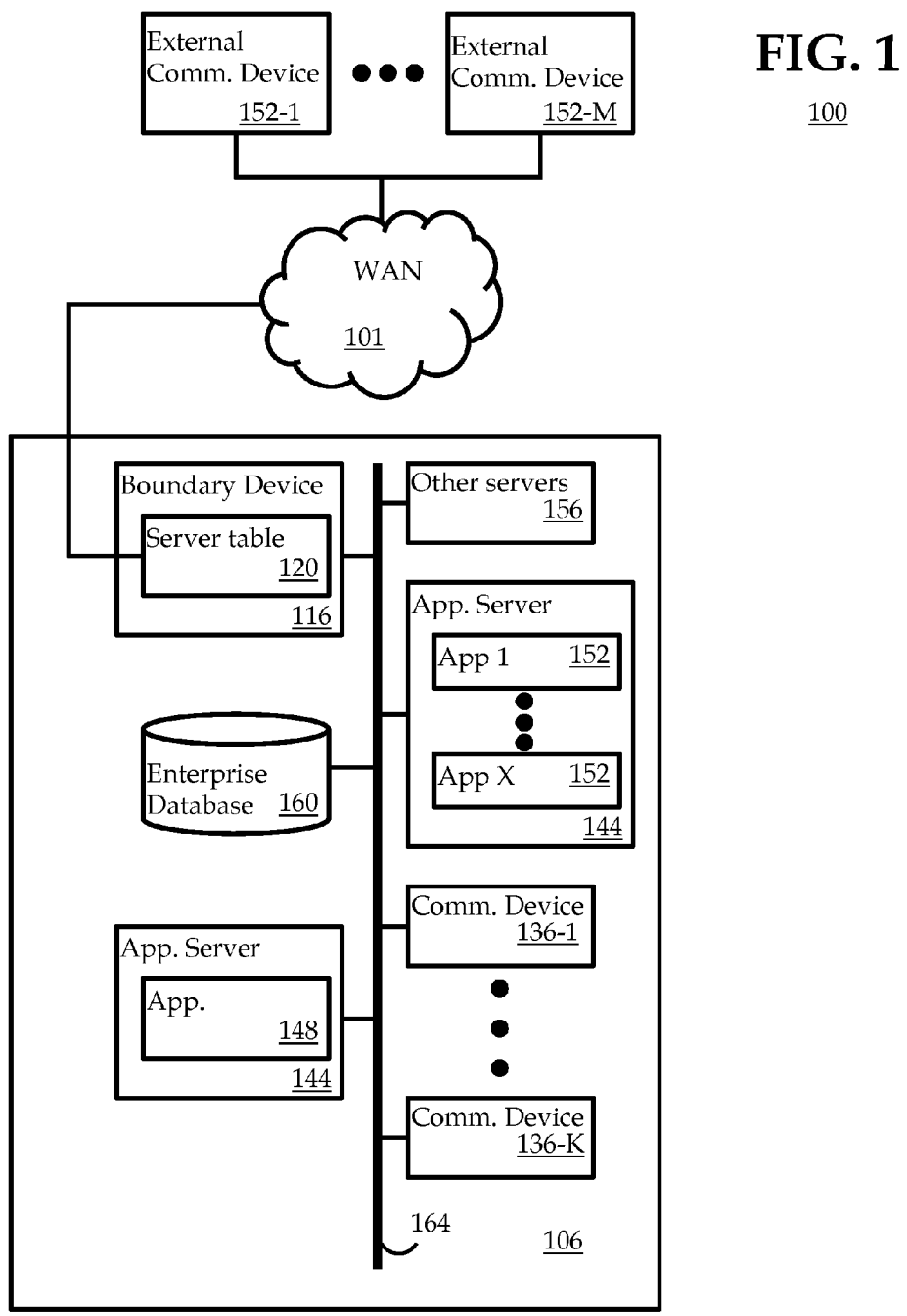
FIG. 1 is a block diagram depicting a system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to store large, substantially static data in a NoSQL database.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

Embodiments of the present invention generally relate to efficient operation of a NoSQL database, and, in particular, to a system and method for compacting a NoSQL database in which most of the stored data comprises substantially static data.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical data storage medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

FIG. 1 depicts a system 100 that is usable as part of a NoSQL database system, according to an embodiment of the present disclosure, with an emphasis on depicting exemplary components of server 106. System 100 may include one or more servers 106 that are in communication, via a network 101, with one or more external computing nodes 152. Network 101 may include an untrusted or unsecure or public wide area network ("WAN") such as the Internet. The external computing nodes 152 are not under the direct control of the enterprise administering the server 106 and/or have a decreased level of trust with the server 106 as compared with communication devices 136-1 . . . 136-K that are within the server 106. Communication devices 136-1 . . . 136-K may include a local terminal or similar interface to provide direct, local control of server 106. Exemplary types of external computing nodes 152 include, without limitation, laptops, Personal Computers (PCs), Personal Digital Assistants (PDAs), gateways to other LANs or WANs, and the like.

The server 106 may include a boundary device 116 including a server table 120, one or more internal communication devices 136-1 . . . 136-K, one or more application servers 144 which may be capable of providing one application 148 or a set of different applications 152, a number of other servers 156 to provide other functions of server 106, and an enterprise database 160, all of which are interconnected by a (trusted or secure or private) Local Area Network (LAN) 164. Some or all of the functions depicted in FIG. 1 may be co-hosted and/or co-resident on a single server, or physically dispersed among more than one server which are configured to operate cooperatively. The depiction of components in FIG. 1 is generally intended to be a logical depiction of the components of the system 100.

The LAN 164 can be secured from intrusion by untrusted parties by a gateway and/or firewall located between the LAN 164 and network 101. In some embodiments the boundary device 116 may include the functionality of the gateway and/or firewall. In some embodiments, a separate gateway or firewall may be provided between the boundary device 116 and network 101.

In some embodiments, network boundary device 116 is responsible for initially routing communications within the server 106 for servicing a particular user involved in accessing the NoSQL database system.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence.

Figure 2:
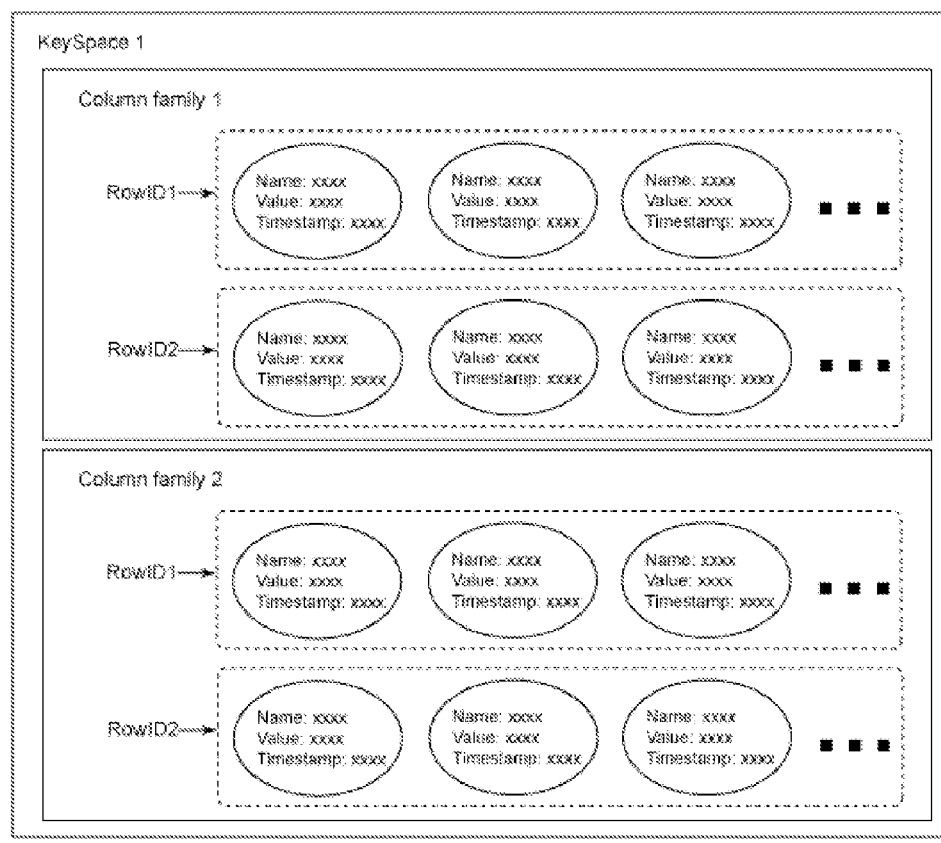
FIG. 2 illustrates at a high level of abstraction a database file layout, in accordance with an embodiment of the present invention.

FIG. 2 illustrates a simplified layout of a Cassandra database file 200 that is usable with embodiments in accordance with the present invention. File 200 illustrates a column family data model, in which the data model includes columns, rows, column families, and keyspace. Each column includes a name, a value, and a timestamp. A column may be represented as a name value pair, for example a first row with key "Anne" may have a name value pair of "LastName=Pruner" with timestamp "12345," and another column with name value pair of "Color=red" with timestamp "6678". A second row with key "Fred" might have only one name value pair "band=Styx" with timestamp "938394". A column family may include a collection of rows labeled with a name.

A row of file 200 may include a collection of columns labeled with a name. A Cassandra database may include many storage nodes, and Cassandra stores each row within a single storage node. Within each row, Cassandra stores columns as sorted by their column names. Using this sort order, Cassandra supports slice queries in which for a specified row, users can retrieve a subset of columns of file 200 falling within a given column name range. For example, a slice query with range tag0 to tag9999 will get all the columns whose names fall between tag0 and tag9999.

A keyspace may include a group of many column families together. The keyspace is a logical grouping of column families and may provide an isolated scope for names.

File 200 may also include metadata (not shown in FIG. 2) for one or more rows.

Cassandra uses consistent hashing to assign data items to nodes. Cassandra may use a hash algorithm to calculate a hash for keys of each data item stored in Cassandra (for example, column name, row ID). The hash range or all possible hash values (also known as keyspace) is divided among the nodes in the Cassandra cluster. Then Cassandra assigns each data item to the node, and that node is responsible for storing and managing the data item.

Cassandra provides a flexible schema such that any number of name/value pairs (i.e., columns) can be present, and each row can contain entirely different data elements from the other rows within the column family. A thorough description of the structure allowed within a Cassandra database is not necessary here, and the simplified structure of FIG. 2 is adequate to illustrate embodiments in accordance with the present invention.

Distributed file systems often replicate data across data centers as a way to keep search latencies down. Replicated files provide for high availability at the expense of consistency. For example, Cassandra uses replication to achieve high availability and durability. Each data item is replicated at N hosts, where N is the replication factor configured "per-instance." Failures in hardware, software, or data messaging at hosts, or differences in latency of communication between hosts when updating database contents, produces inconsistency among the replicated files. A record that is replicated at more than one host is identified as such by matching Key_ID values across different hosts.

Compaction processes known in the art for NoSQL databases such as a Cassandra database include: (1) A size-tiered compaction process; and (2) A leveled compaction process. Both processes require compaction of all files to occur on a periodic basis, even if there are no mutated (i.e., updated) or deleted rows.

The size-tiered compaction process creates groups of data files having similar sizes, and compacts together the like-sized data files. The process may be repeated iteratively. For example, the size-tiered compaction process may compact together ten files, each of size 1 Mb. For typical amounts of row mutations (i.e., edits) and deletions, this process may result in a single 5 Mb file. Then, in a next iteration of the process, the size-tiered compaction process would group the 5 Mb file together other files of about the same size that had been formed in the same way (i.e., by compacting smaller files together), in order to create an even more inclusive file. Actual file size would usually increase, but may also decrease, depending of the number of row deletions. In this way, the process iterates to create ever more inclusive files, until the process produces only a few files remaining, each of which may have distinctly different file sizes.

The leveled compaction process is a multi-level process in which each file starts out at level zero (0). The leveled compaction process compacts all level zero files together, creating a series of substantially equal-sized files. As the process compacts rows together, if a file grows to a threshold size, the process will close that file, and continue the process using a new file. The level number of the new file and any remaining open files is incremented (e.g., if the closed file was a level zero file, then the open files are designated as level one (1)). This process repeats iteratively. When the number of a current level's files reaches a threshold (e.g., one hundred files for level one), the process may transition to a next level, such that the process compacts those files together, designating the resulting files with the next higher level (e.g., level two). The threshold size of a level's group increase by an order of magnitude per level. So before level two files are compacted, there must be 1,000 files of level two. Similarly, there must be 10,000 files of level three before the level three files are compacted.

A problem of both the size-tiered compaction process and the leveled compaction process is that compacting large amounts of immutable data by either of these two processes is inefficient. Both compaction processes require iterative copying of immutable data, which results in high CPU usage and disk writing. Both compaction processes require compaction to be performed only when enough files of the correct size or level are available. This means that if there are no more files written, the compactor will not do any more compacting. It is not known how much space would be freed up by deletes until much more data is written. This problem also exists with methods of the known art that defer compacting until a large enough percentage of a file is marked as deleted, because the size of data on disk will not necessarily reduce unless or until the data to be deleted is in the right pattern. For example, if data to be deleted is stored all within one file on the disk, then that file will be deleted. However, if the data to be deleted is spread evenly throughout the database, with one row per file, then nothing will get deleted. Furthermore, the size-tiered compaction process requires relatively high disk space overhead in order to compact its largest files.

For immutable data, a Datastax process known in the art may be used whereby when a row deletion is found in a file, the Datastax process finds a matching row, and rather than removing deleted row immediately, the Datastax process marks the row as deleted. If the number of rows that are marked as deleted in a particular file exceeds a preconfigured threshold value, then the Datastax process compacts just that file, effecting the deletion of the data from disk. However, depending on the pattern of rows to be deleted and the distribution of deleted rows across files, deleting data may not result in a reduction of data stored in the disk.

In particular, if using the Datastax process, files in a Cassandra File System ("CFS") are stored as lists of immutable data blocks. Immutability in this context means it is not possible to change a data block once it has been saved to the CFS. The Hadoop File System API also does not allow for updating file contents. The only permitted modification is deleting the block. Block immutability guarantees that each block is present in at most one Sorted String Table ("SSTable") at a time. Second, blocks are large, e.g., 128 MB large or often larger. This means a few tens of thousands of blocks is enough to store a terabyte of data on a single node. Additionally, a single SSTable contains at most a few blocks and accessing a random block does not incur a huge relative overhead, as it would be if blocks stored only a kilobyte each.

A shortcoming of the Datastax compaction process is that the Datastax process depends on fully indexing the data files. The Datastax process index assumes that files are handled in chunks of up to about 128 MB in size. Such indexing may be problematic when the actual file size is much smaller than the file size assumed by the Datastax process, e.g., several orders of magnitude smaller. For example, some databases of substantially static data may be made up of files having a typical size of about 1 MB, which is far smaller in size than one chunk of the Datastax process. Such databases may have a largest file of about 32 MB in size, which is still smaller than a single Datastax chunk. Fully indexing a large database having file sizes with such characteristics may require an index file in excess of 2 GB in size, which is greater than what could reasonably be expected to be stored in RAM memory.

Embodiments in accordance with the present invention mitigate the aforementioned shortcomings of the known art, particularly when applied to large substantially static databases having a small typical file size, by implementing a "deletion compactor" process. The deletion compactor process performs a compaction only after deletions, or after a threshold level of deletions, occurs in the database. Consequently, most of the time data is not compacted. Embodiments in accordance with the present invention also do not rely upon indexing of the data files, thereby allowing for the handling of more and/or smaller chunks of data.

Cassandra ordinarily stores files in memory. As records of a file are deleted, Cassandra retains these deleted records in working memory. When memory is full or there is an indication that the files need to be written to disk, then the file is flushed to disk. When the file is flushed, a relatively large number of deleted records may be written to disk. Therefore, deletions may occur in large batches, and a newly flushed file may contain thousands of deleted records. For some large databases of substantially static data, flushes and deletions may be scheduled to occur primarily in large batches during low-throughput times. Embodiments in accordance with the present invention may perform the compaction process when the file is flushed. Therefore, in some embodiments of the invention, compacting the database after each batch of deletions will occur during low-throughput times, thereby using little CPU or disk resources during normal operation. The deletion compactor process also avoids a major problem of the size-tiered process, in which a large amount of temporary disk space storage must be reserved in order to compact large files using the size-tiered process. Furthermore, the deletion compactor process compacts as soon as updated files without deletions are written to disk, thereby allowing for faster updates in a timelier manner regarding how much disk space has been freed up by the deletes.

An embodiment of the deletion compactor process may proceed as follows. Assume a large, static database includes a large number of relatively small files as discussed above. As a file is written, the deletion compactor process receives a notice from the Cassandra database regarding that data has been written to the file. The deletion compactor process will note this file as a file that should be checked. The deletion compactor process will add the new file to a listing of all files used by the present database, along with an indicator of the lowest and highest keys used in the file. The deletion compactor process will then add the file to a list of "new" file s to be checked.

Figure 3:
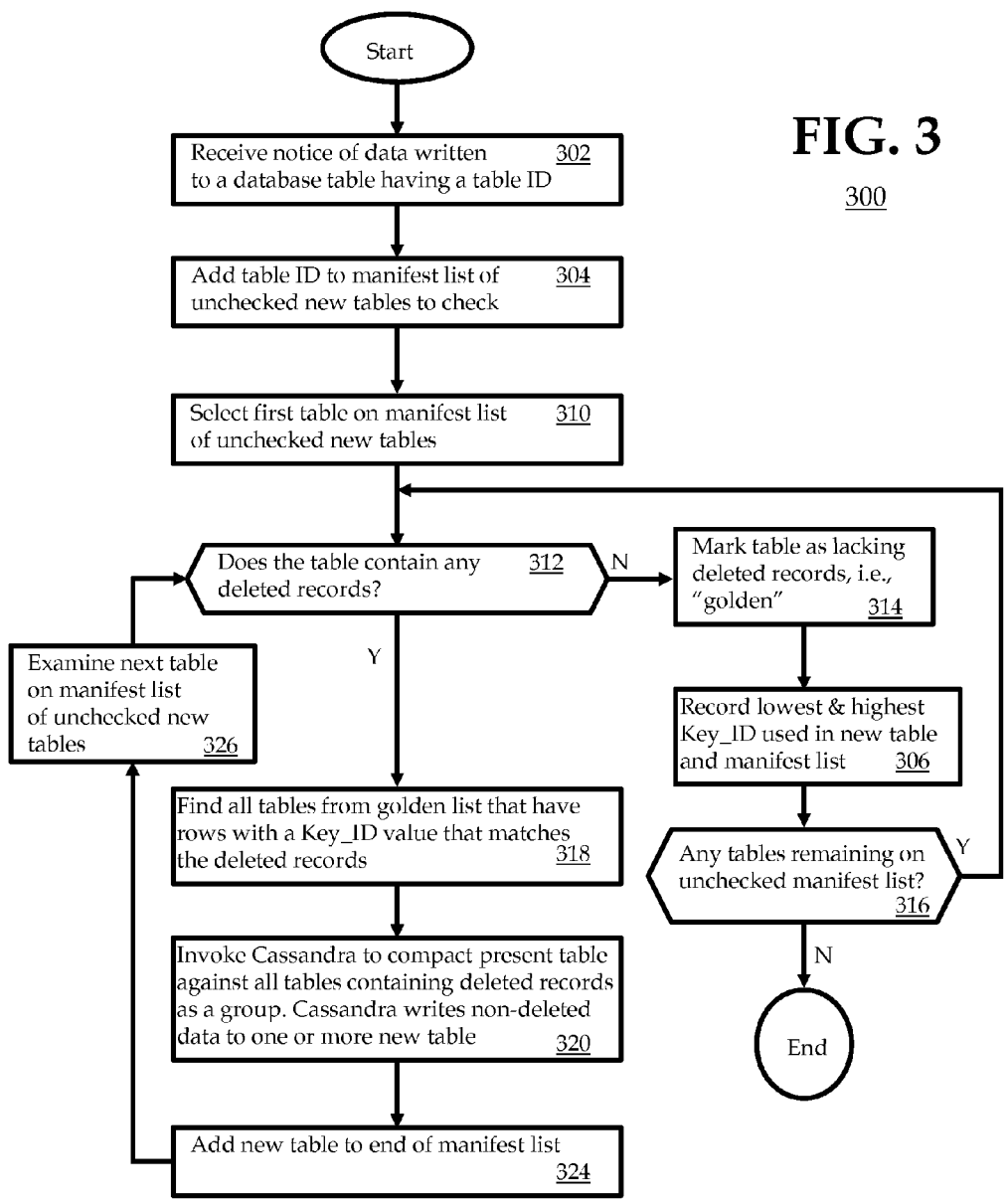
FIG. 3 illustrates a method for compaction, in accordance with an embodiment of the present invention.

FIG. 3 illustrates a process 300 in accordance with an embodiment of the present invention. Process 300 begins at step 302, at which a notification is received from the NoSQL database (e.g., Cassandra) that data has been written to the database. For example, notification may be by way of configuring Cassandra to bind to process 300 so that process 300 will be performed when Cassandra performs its post-flush operation. Cassandra may initiate a post-flush operation by running a "notify" method in a DeletionCompactor class. The data may represent substantially any digital data that may be stored in a database. The data may be, for example, data received from another process (not illustrated), a result of a calculation, an audio/video file, a recording of a streaming media, and so forth. The notification includes a file ID or the like, which identifies the file that has been written to.

Next, at step 304, process 300 adds the file ID to a manifest (i.e., a listing) of files for this database. The manifest may contain two lists: one list indicating all the new files that have not yet been checked for deleted records (the "unchecked list"), and a second list indicating all the files that have already been checked for deleted records. Step 304 will add the file ID to the unchecked list. Control of process 300 then passes to step 310.

Next, at step 310, the first file from the manifest list of unchecked new files is selected. Control of process 300 then passes to step 312.

Next, at step 312, the presently selected file from the manifest is checked for the presence of any deleted records. If the result of step 312 is negative, then control of process 300 passes to step 314. If the result of step 312 is positive, then control of process 300 passes to step 318.

At step 314, the presently selected file from the manifest is promoted to a list of "golden" files, i.e., files for which there are no deleted records within. Ordinarily, for databases having a large amount of static data, most files will be found to be golden files. Control of process 300 then passes to step 306.

At step 306, process 300 scans the new golden file in order to find the range of Key_ID values contained in the golden file, as indicated by the lowest and highest Key_ID values found. Embodiments may save the high and low Key_ID values from the golden file as a screening tool, and later use this as a screening tool (e.g., in step 318) to determine whether the range of Key_ID values in each golden file overlaps with the Key_ID values of the deleted rows. Control of process 300 then passes to step 316.

At step 316, a query is made whether there remain any files in the unchecked list of the manifest. These unchecked files may have deleted records. If the result of step 316 is negative, then process 300 ends, and the database is deemed to be compacted. Otherwise, control of process 300 proceeds to step 318.

If the result from step 312 is that the presently selected file contains one or more deleted records, then at step 318 all "golden" files are checked to determine whether they include any records that have a Key_ID value that matches the Key_ID values of the deleted records. This check may be implemented as a search, e.g., a search of whether the Key_ID value of a deleted record in the presently selected file appears in any of the golden files, or a search of whether the Key_ID values of records in each of the golden files are present in the presently selected file as the Key_ID values of a deleted record.

Next, at step 320, any golden files found in step 318 may be sent to Cassandra as a group to be compacted against the file determined in step 312 as containing deleted records. Cassandra compares all the files that it is given to compact, and chooses for each Key_ID value the most current version based upon the timestamp. If the most current version is a delete, then instead of writing the record, it deletes the record or otherwise indicates that the record has been deleted. This may result in some of the records in the original files being deleted. The records that have not been deleted are placed into a new file, and an identifier of the new file is added to the end of the manifest list so that the new file is re-checked for deleted records. When these new files are examined at step 312, they are usually promoted immediately and handled by step 314. However, if there were any deletes that were missed, it gives process 300 another opportunity to remove the deleted records. The non-deleted records are written to a new file by Cassandra.

In some embodiments (not illustrated), the golden files found in step 318 may be divided into more than one group, and the groups may be sent separately to Cassandra for compaction. Dividing groups this way may be useful may be useful for files containing thousands of deletes, for which a great number of golden files may contain corresponding data. Throughput of the Cassandra compaction process has been found to degrade when relatively large numbers of files are to be compacted.

In some embodiments in accordance with the present invention, there may be a separate compactor for each column family. For example, a deletion compactor in accordance with an embodiment of the present invention may be configured for one column family, and a size-tiered compactor for all the other column families. If a database has two column families configured to use a deletion compactor, then each of those column families would have its own manifest file to hold the new and golden lists for the respective column family.

Next, at step 324, the new file from the previous step is written to the end of the manifest list.

Next, at step 326, the next file on the manifest list of unchecked new files is selected as the selected file to examine, and control of process 300 transitions to step 312.

Persons of skill in the art will realize that certain steps depicted in FIG. 3 may be presented at a high level of abstraction so as not to obscure the underlying principles. Certain steps may be performed in a different order, or may be performed in parallel, while still accomplishing the overall objective of process 300.

Embodiments in accordance with the present invention provide an opportunity to limit the number of files that are compacted at one time, which consequently limits the disk headroom needed to perform compaction. If there were deleted records that could not be removed from the data files in a first iteration, because doing so at that time would require a compaction of too many files at one time, those files with deleted records may be written by Cassandra while compacting the data files together. The files are added to the manifest and are compacted again when the files are selected from the manifest list at step 326. In the next iteration, each of these new files, because they contain deletes, will get matched up with another set of files that have Key_ID values matching the new file.

Embodiments of the present invention include a system having one or more processing units coupled to one or more memories. The one or more memories may be configured to store software that, when executed by the one or more processing unit, allows compaction of data in large, predominantly static NoSQL databases, at least by use of processes described herein, including at least in FIG. 3 and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to compact a NoSQL database, comprising:
   receiving, by a receiver coupled to a processor, an indication of a record to delete in the NoSQL database wherein the database includes one or more files containing the record to delete and one or more files not containing the record to delete;
   for each file in the NoSQL database, perform the steps of:
      if said file does not contain the indication of the record to delete, placing said file in a first memory;
      if said file contains the indication of the record to delete:
         placing said file in a second memory;
         searching whether the record to delete from said file in the second memory matches a record in any files in the first memory; and
         if any searched files in the first memory contain the record to delete from said file in the second memory, compacting said file in the second memory with the any files in the first memory that contain the record to delete.

2. The method of claim 1, wherein the step of searching said file comprises using a key field to find matching records.

3. The method of claim 1, wherein the step of searching comprises the step of searching any files in the first memory for the record to delete from said file in the second memory.

4. The method of claim 1, further comprising recording a range of key field values in said file.

5. The method of claim 1, wherein the step of compacting said file in second memory is performed each time a searched file in the first memory is found to include the record to delete from the file in the second memory.

6. The method of claim 1, wherein the step of compacting said file in the second memory is performed for a plurality of files in the first memory, which include a record to delete from the file in the first memory.

7. The method of claim 1, wherein the step of compacting is performed by a Cassandra process.

8. A system to compact a NoSQL database, comprising:
   a receiver coupled to a processor, the receiver configured to receive an indication of a record to delete in the NoSQL database wherein the database includes one or more files containing the record to delete and one or more files not containing the record to delete;
   a processor coupled to a first memory and a second memory, the processor configured to perform for each file in the NoSQL database, the steps of:
      if said file does not contain the indication of a record to delete, placing said file in the first memory;
      if said file contains the indication of a record to delete:
         placing said file in the second memory;
         searching whether the record to delete from said file in the second memory matches a record in any files in the first memory; and
         if any searched files in the first memory contain the record to delete from said file in the second memory, compacting said file in the second memory with the any files in the first memory that contain the record to delete.

9. The system of claim 8, wherein the step of searching said file comprises using a key field to find matching records.

10. The system of claim 8, wherein the step of searching comprises the step of searching any files in the first memory for the record to delete from said file in the second memory.

11. The system of claim 8, further comprising a module configured to record a range of key field values in said file.

12. The system of claim 8, wherein the step of compacting said file in second memory is performed each time a searched file in the first memory is found to include the record to delete from the file in the second memory.

13. The system of claim 8, wherein the step of compacting said file in the second memory is performed for a plurality of files in the first memory, which include a record to delete from the file in the first memory.

14. The system of claim 8, wherein the step of compacting is performed by a Cassandra process.

* * * * *